May 7, 1929.  B. F. ELBERT  1,711,778
BROILER
Filed March 27, 1928
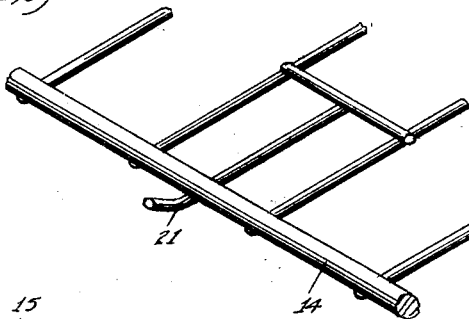
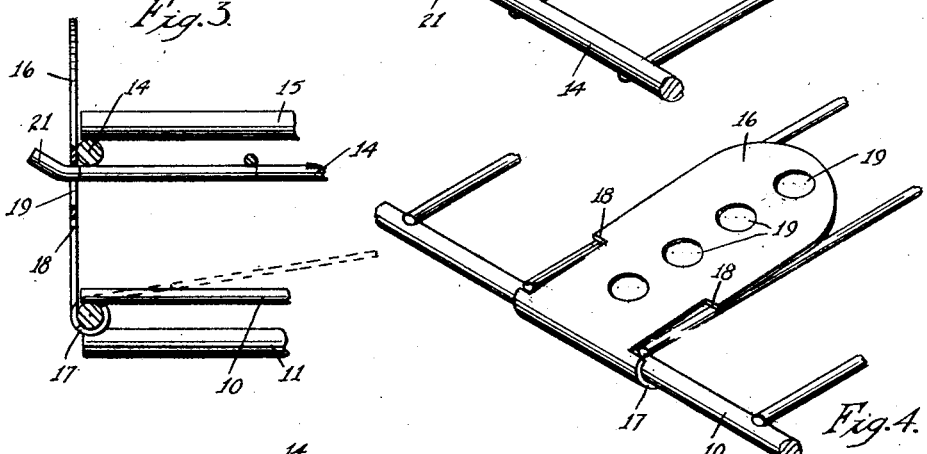
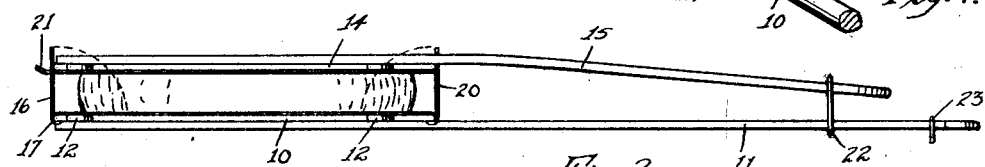
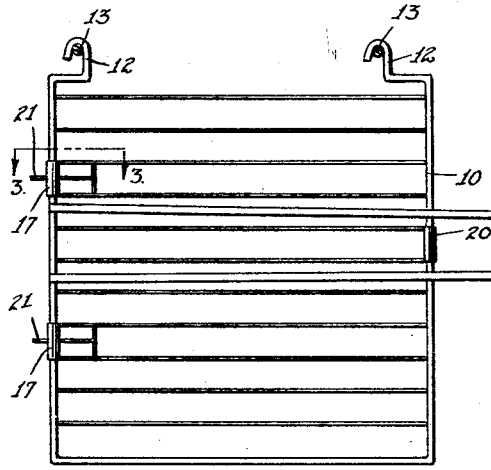
Inventor.
Benjamin F. Elbert
by Orwig & Hague Attorneys.

Patented May 7, 1929.

1,711,778

UNITED STATES PATENT OFFICE.

BENJAMIN F. ELBERT, OF DES MOINES, IOWA, ASSIGNOR TO B & G SPECIALTY COMPANY, OF WASHINGTON, DISTRICT OF COLUMBIA, A CORPORATION OF THE DISTRICT OF COLUMBIA.

BROILER.

Application filed March 27, 1928. Serial No. 265,008.

The object of my invention is to provide a broiler of simple, durable and inexpensive construction, especially designed for use in connection with a grate or heating surface presented vertically, and so arranged that the position of one of the broiler grids relative to the other may be readily, quickly and easily adjusted so that the grids will firmly clamp between them articles to be cooked of varying thicknesses; and also to provide a device of this character in which the parts may be readily, quickly and easily folded to occupy a minimum space for shipping and storing.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a broiler embodying my invention.

Figure 2 shows a side elevation of same with an article to be cooked between the grids. The dotted lines in this figure show the path of movement of the folding grid connecting devices.

Figure 3 shows an enlarged, detail, sectional view on the line 3—3 of Figure 1. The dotted lines show the adjacent grid connecting member in folded position.

Figure 4 shows an enlarged, detail, perspective view of a portion of one of the grid members, and showing one of the grid connecting members in folded position; and Figure 5 shows a detail perspective view illustrating the projecting hook device on one of the grid members to co-operate with the connecting member on the other grid member.

Referring to the accompanying drawings, I have used the reference numeral 10 to indicate generally one of the grid members, which is of the ordinary construction, and is provided with a handle 11. This grid member 10 has at one of its side edges two hooks 12 designed to support the broiler in an upright position upon two supporting rods 13, as shown in Figure 1. The other grid member is indicated generally by the reference numeral 14 and is provided with a handle 15.

At the outer end of one of the grid members are two grid connecting devices, each of which comprises a flat sheet metal body portion 16 having one end curved at 17 to partially encircle the end wire of the grid.

The end of the part 17 is so arranged that it will engage one of the longitudinal grid wires when the body portion 16 is in position at right angles to the grid to which it is hinged, as clearly shown in Figure 3, thus limiting the outward movement of the connecting member 16.

On the side edges of the part 16 are formed shoulders 18 so shaped that when the plate 16 is in position nearly parallel with the longitudinal wires of the grid, these shoulders will engage the two adjacent longitudinal wires and limit the downward movement of the connecting member 16. This connecting member is provided with a series of openings 19 for purposes hereinafter made clear.

At the central portion of the opposite edge of the grid there is a similar connecting member 20 hingedly connected to swing from a nearly horizontal position over the grid to position substantially at right angles to the grid.

On the opposite grid member I have provided two connecting bars 21, fixed to and projecting from the outer end of the grid, their projecting ends being slightly curved away from the other grid, as clearly shown in Figures 3 and 5. These bars 21 are so spaced relative to each other that they may both be projected through the openings 19 in the connecting plates 16 when the two grid members are in the same plane, as shown in Figure 1.

Slidingly mounted upon the handle 11 are two retaining loops 22 and 23, one being of larger diameter than the other, and being so arranged that when the two grids are widely separated, the larger retaining member 22 may be slipped over the handle 15; and when the grids are relatively close together, the smaller retaining member 23 may be employed.

In practical use, and for purposes of shipping or storing, the connecting plates 16 and 20 are folded down flat against the grid member 10, and then the grid member 14 is placed on top of them and the retaining members 23 and 22 are slid over the handles until close to the grids, and the entire device is thereby held together and occupies a minimum of space.

When it is desired to use the broiler for a comparatively thin steak, the operator raises the connecting plates 16 and 20 to position at right angles to the grid, and he then inserts the rods 21 of the grid member 14 into the lower ones of the openings 19. He then swings the grid member 14 to position parallel with the grid member 10 and clamps it in this position by means of the retaining member 23.

When it is desired to broil a relatively thick article, the operator places the article upon the grid 10, elevates the handle 15 of the grid 14 and inserts the rods 21 into the upper ones of the openings 19, and then moves the grid 14 down to position parallel with the grid 10 and then bends the handle 15 downwardly a slight distance toward the handle 11, as shown in Figure 2, and then places the retaining member 22 on the handle member 15.

When in this position, obviously the grid members will accurately fit the surfaces of the article clamped between them, and they will forcibly hold the article in this position. The connecting plates 16 prevent movement of the grid member 14 in a direction away from the handles, and the plate 20 prevents movement of the grid 14 in a direction toward the handles. Furthermore, the rods 21 and the openings 19 prevent movement of the grid members laterally relative to each other. Hence, with my improved broiler articles to be cooked of various thicknesses and shapes may be readily and quickly firmly clamped between the grid members, and the broiler may then be supported in upright position, as shown in Figure 1, without danger of having the article to be cooked slip out between the grip members.

I claim as my invention:

1. A broiler comprising in combination two grid members, a handle for each grid member, a connecting plate hinged to the outer end of one of the grid members and capable of movement from position approximately parallel with the grid member to position substantially at right angles to the grid member, a second connecting plate hinged to the opposite end of the said grid member and capable of movement from position approximately parallel with the grid member to position approximately at right angles thereto, a connecting rod on the opposite grid member adjustably, detachably and pivotally connected with one of the hinged connecting plates and held against movement in one direction by the other connecting plate, and means for holding the handle members toward each other.

2. An improved broiler, comprising a grid member having round wires at its ends and longitudinally extended wires between the ends, two connecting members, each comprising a body portion having a series of openings therein and hinged at one end to the adjacent end rod of the broiler and capable of movement from position nearly parallel with the broiler to position substantially at right angles thereto, and being limited against further movement, a third connecting member hinged to the opposite end wire of the grid member and capable of movement from position approximately parallel to the broiler to position substantially at right angles thereto and held against further movement, a second grid member having a handle, and having at one end two projecting rods designed to enter said openings in the connecting members, the latter grid member being held against movement toward the handle end of the grid members by the third one of said connecting plates when the latter is in position substantially at right angles to the grid member with which it is connected, and means for clamping together the handle members of the grids.

3. An improved broiler, comprising a grid member having round wires at its ends and longitudinally extended wires between the ends, two connecting members, each comprising a body portion having a series of openings therein and hinged at one end to the adjacent end rod of the broiler and capable of movement from position nearly parallel with the broiler to position substantially at right angles thereto, and being limited against further movement, a third connecting member hinged to the opposite end wire of the grid member and capable of movement from position approximately parallel to the broiler to position substantially at right angles thereto and held against further movement, a second grid member having a handle, and having at one end two projecting rods designed to enter said openings in the connecting members, the latter grid member being held against movement toward the handle end of the grid members by the third one of said connecting plates when the latter is in position substantially at right angles to the grid member with which it is connected, and means for clamping together the handle members of the grids, said connecting members being pivoted to the grid between the longitudinal wires of the grid, and being formed with shoulders designed to engage the two adjacent longitudinal wires when folded to position substantially parallel with the grid.

Des Moines, Iowa, March 20, 1928.

BENJAMIN F. ELBERT.